(12) United States Patent
Berman et al.

(10) Patent No.: US 8,494,213 B2
(45) Date of Patent: Jul. 23, 2013

(54) OPTIMIZED IMPLEMENTATION OF BACK PROJECTION FOR COMPUTED TOMOGRAPHY (CT)

(75) Inventors: Ari P. Berman, Lexington, MA (US); Daniel Naar, San Mateo, CA (US)

(73) Assignee: Mercury Computer Systems, Inc., Chelmsford, MA (US)

( * ) Notice: Subject to any disclaimer, the term of this patent is extended or adjusted under 35 U.S.C. 154(b) by 9 days.

(21) Appl. No.: 13/354,587

(22) Filed: Jan. 20, 2012

(65) Prior Publication Data

US 2012/0189158 A1    Jul. 26, 2012

Related U.S. Application Data

(60) Provisional application No. 61/435,107, filed on Jan. 21, 2011.

(51) Int. Cl.
*G06K 9/00* (2006.01)
(52) U.S. Cl.
USPC ............................ 382/100; 382/131; 382/154
(58) Field of Classification Search
USPC ......... 382/100, 128–132, 154, 254, 274–275, 382/298–300; 378/4, 21–27, 41, 210; 345/419–420, 427–428; 348/51
See application file for complete search history.

(56) References Cited

U.S. PATENT DOCUMENTS

| | | | | |
|---|---|---|---|---|
| 4,809,065 | A * | 2/1989 | Harris et al. | 348/51 |
| 7,149,276 | B2 * | 12/2006 | Hein | 378/4 |
| 7,355,598 | B2 * | 4/2008 | Yang et al. | 345/420 |
| 7,379,575 | B2 * | 5/2008 | Ruhrnschopf | 382/128 |
| 7,809,100 | B2 * | 10/2010 | Shechter | 378/4 |
| 7,894,567 | B2 * | 2/2011 | Hagiwara | 378/4 |
| 8,107,592 | B2 * | 1/2012 | Berman et al. | 378/210 |
| 2005/0249431 | A1 | 11/2005 | Ruhmschopf | |
| 2005/0286749 | A1 | 12/2005 | De Man et al. | |
| 2007/0280404 | A1 * | 12/2007 | Nielsen et al. | 378/4 |
| 2009/0195541 | A1 | 8/2009 | Peng et al. | |
| 2010/0272342 | A1 | 10/2010 | Berman et al. | |

OTHER PUBLICATIONS

International Search Report and Written Opinion for Application No. PCT/US12/22051, 6 pages, dated May 25, 2012.

* cited by examiner

*Primary Examiner* — Ishrat I Sherali
(74) *Attorney, Agent, or Firm* — Nelson Mullins Riley & Scarborough LLP

(57) ABSTRACT

The disclosure relates generally to a method of three dimensional (3D) tomographic volume reconstruction for computed tomography (CT) using vector processors and more specifically to an optimized implementation which pre-computes back projection weights and perspective geometry data associated with a given CT device as down-sampled tables. The down-sampled perspective geometry data and the weight table are interpolated dynamically as part of the volume reconstruction process for an object scanned using the given CT device.

20 Claims, 8 Drawing Sheets

OPTIMIZED IMPLEMENTATION OF BACK PROJECTION FOR COMPUTED TOMOGRAPHY (CT)

RELATED APPLICATIONS

This application claims the benefit of provisional patent application U.S. Ser. No. 61/435,107, filed Jan. 21, 2011, the content of which is hereby incorporated by reference.

BACKGROUND

A tomogram is a two-dimensional image of a slice or section through a three-dimensional object. A tomograph is the apparatus for generating a tomogram. Tomography is the entire process to produce a tomogram. Computed Tomography (CT) is the entire process to produce a tomogram where the computation is performed by a computer.

CT is composed of two major steps or processes. The first is scanning a three dimensional object and the second is computing tomograms of the scanned body. Multiple tomograms are combined to produce a three dimensional density map or volume representation of the scanned object.

A typical CT scan system is formed of a radiation source, such as an x-ray tube, a radiation detector, and a computer system. The radiation source and detector are positioned on opposite sides of an object to image. A beam of radiation is then projected from the source towards the detector, and those photons not absorbed by the object are transmitted toward and impact on the detector. The result is an image on the detector that represents a two-dimensional projection image of the tree-dimensional object from the current position of the x-ray source. The source and detector are typically rotated around the object 180° or 360°, during which the imaging process is repeated at a number of intermediate positions, so that a series of two-dimensional images of the object over a range of angular orientations is acquired. A CT scan system can also scan an object using a set of fixed x-ray sources and detectors that surround the object so that neither the x-ray source, nor the detector is moved. A CT scan can be performed with the body at rest or in motion perpendicular to the scanning apparatus. The latter case results in a helical scan.

A series of these projection images from the detector is fed into a computer system. The computer system can use these two-dimensional projections to create various reconstructions of the object. This concept is known as tomographic volume reconstruction. A variety of mathematical algorithms, including but not limited to, Feldkamp back-projection, algebraic reconstruction technique (ART), and maximum likelihood expectation maximization (MLEM), can be used in connection with tomographic volume reconstruction. Most algorithms are based on the assumption that a large number of projection measurements are made, such that every point in the object is included in radiation paths from many angles. Feldkamp back-projection is a reconstruction technique in which projection data is first convolved with a filter, and each view is successively superimposed over a square grid, which represents the volume that was imaged, at an angle that corresponds to angle of the x-ray source at the moment of acquisition. During the process of superimposition or accumulation, the perspective geometry must be known to obtain the location of the projection of each element of the grid onto the detector, and a multiplicative weight factor must also be known and applied to the value from the filtered detector data.

The perspective geometry and the multiplicative weight factor require evaluating computationally expensive transcendental functions. For some CT scan systems these calculations are further complicated because the weight factors and perspective geometry cannot be determined by analytic functions and must be determined by using a priori knowledge of the location of the x-ray source and detector. In either case the perspective geometry and the weight factors can be pre-computed and stored in memory. For some scanners the array of detectors and X-Ray source are constructed to be perfectly symmetric across one or two axes. By exploiting these geometric symmetries the size of the tables for weight factors and geometry can be reduced.

For CT scans where the object is moving, if the motion through the scanner is coordinated appropriately with the production of the projections, the weight computation will also be repetitive over some cyclic interval; thus allowing the weight tables and the perspective geometry to be pre-computed as is the case for CT scan of a stationary object.

Even if symmetries in the scanner geometry can be leveraged to reduce the table size, these tables can become very large and the memory storage and memory access bandwidth requirements can adversely impact the performance of the reconstruction system.

It is therefore an object of this invention to provide an improved method for the storage and access of the pre-computed tables for back-projection reconstruction in CT. This method results in a faster and/or less expensive CT computer system for performing reconstruction using back-projection techniques.

SUMMARY

Embodiments of the present invention provides a method for down-sampling and restoring perspective geometry data and a weight table associated with a given computed tomography device. The method includes generating perspective geometry data associated with the computed tomography device. The method further includes generating a weight table associated with the computed tomography device. The weight table and the perspective geometry data are down-sampled to reduce the amount of data to be stored. The down-sampled perspective geometry data and the down-sampled weight table associated with the computed tomography device are stored in a storage device. The method also includes reconstructing, via interpolation, the perspective geometry data and the weight table from the down-sampled perspective geometry and the down-sampled weight table, respectively, using a computing processing unit during a tomographic volume reconstruction process for an object scanned using the computed tomography device.

According to various embodiments of the present invention, a non-transitory computer readable medium is provided. The medium stores instructions, that when executed on a processor, down-sample and restore perspective geometry data and a weight table associated with a computed tomography device. The medium stores one or more instructions for generating perspective geometry data associated with the computed tomography device. The medium further stores one or more instructions for generating a weight table associated with the computed tomography device. The weight table and the perspective geometry data are down-sampled to reduce the amount of data to be stored. The down-sampled perspective geometry data and the down-sampled weight table associated with the computed tomography device are stored in a storage device. The medium also stores one or more instructions for reconstructing, via interpolation, the perspective geometry data and the weight table from the down-sampled perspective geometry and the down-sampled weight table, respectively, using a graphical processing unit during an tomographic volume reconstruction process for an object scanned using the computed tomography device, wherein the down-sampled weight table is stored as a texture surface by the GPU.

According to various embodiments of the present invention, a system is provided. The system includes a processor for generating perspective geometry data associated with a computed tomography device. The processor is further used for generating a weight table associated with the computed tomography device. The weight table and the perspective geometry data are down-sampled to reduce the amount of data to be stored. The down-sampled perspective geometry data and the down-sampled weight table associated with the computed tomography device are stored in a storage device. The processor is further used for reconstructing, via interpolation, the perspective geometry data and the weight table from the down-sampled perspective geometry and the down-sampled weight table, respectively, using a computing processing unit during an tomographic volume reconstruction process for an object scanned using the computed tomography device.

BRIEF DESCRIPTION OF THE DRAWINGS

The accompanying drawings, which are incorporated in and constitute a part of this specification, illustrate one or more embodiments described herein and, together with the description, explain these embodiments. In the drawings.

DETAILED DESCRIPTION

The present invention provides a method and a system for improving the computational performance of CT reconstruction by use of back-projection on central processing units and graphics processors. CT system uses the geometry of the selected scanner to pre-compute the perspective geometry values and a weight values, associated with the scanner, for every voxel in each plane of a reconstruction volume for every repeating projection, and stores these results in a series of tables. According to various aspects of the present invention, the size of the tables to be stored and loaded during the back-projection may be reduced, thus resulting in reduced memory storage requirement and memory access bandwidth. The present application provides a novel method for down-sampling the pre-computed perspective geometry and weight tables associated with a given scanner, and then interpolating these tables during the back-projection volume computation of an object scanned using that scanner. It is considered counterintuitive and novel to use pre-computed weight tables to reduce the computational requirement, and then to include additional computation to interpolate the weight tables.

The size of the tables cannot be reduced arbitrarily since it is necessary to accurately estimate the weight values and perspective geometry during the reconstruction. This invention also makes the novel observation that both the weight table and the perspective geometry associated with a specific computed tomography device vary slowly for a small submatrix within the reconstructed slice. This observation provides the impetus to store the tables as a set of down-sampled tables; thus reducing the memory storage requirement and memory access bandwidth requirement during tomographic volume reconstruction process. During the process of tomographic volume reconstruction, the geometry and weight tables are themselves reconstructed through some form of interpolation as needed. A key to the value of this innovation is that for many computer architectures the effort required to reconstruct these tables is noticeably less than the effort required to storing them in their original complete from.

Figure 1A:
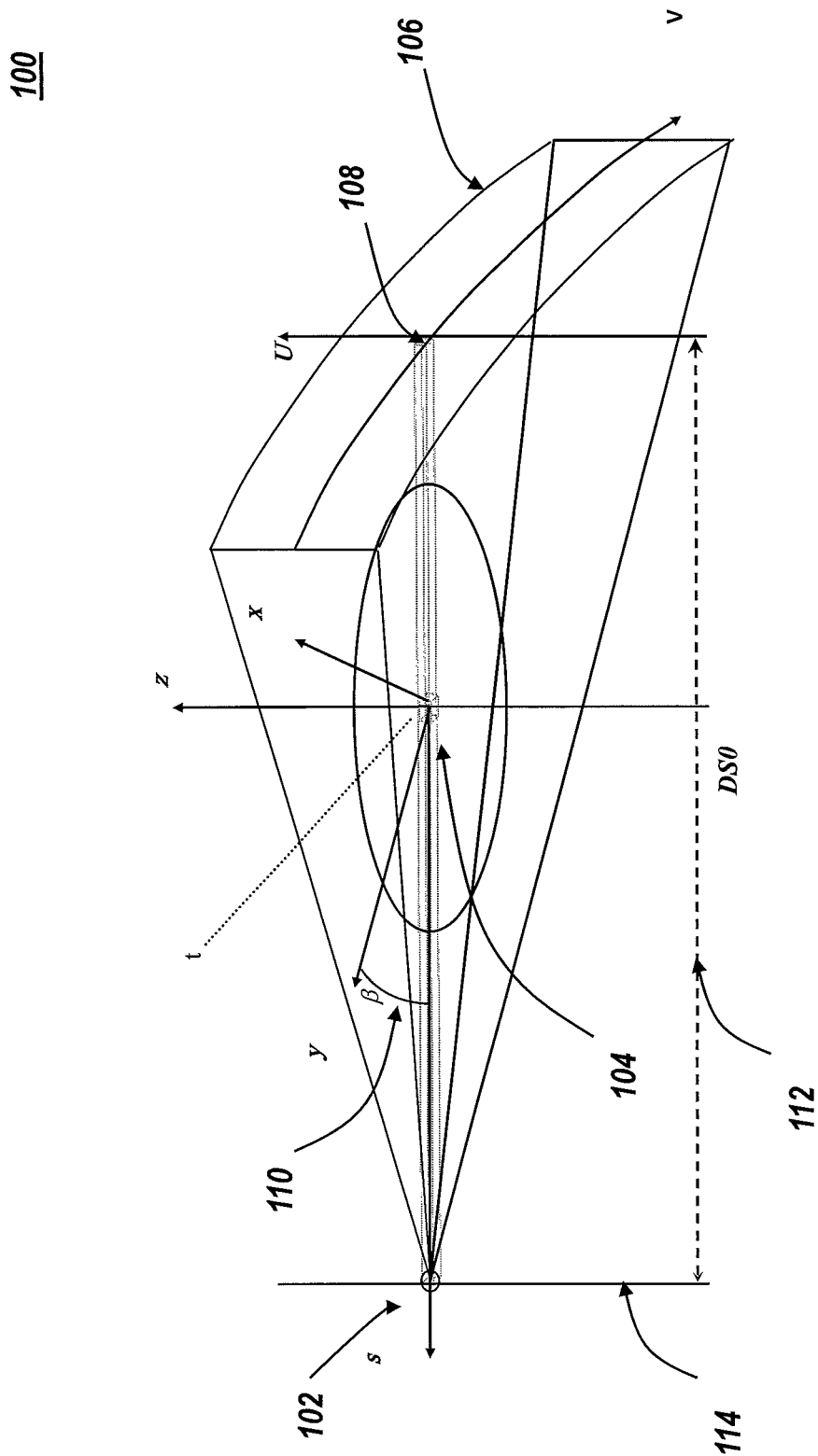
FIG. 1A illustrates an exemplary scanning system 100 for performing computed tomography.

FIG. 1A illustrates an exemplary CT scanning system 100. In the scanning system 100, the source 102 is located to the left of the object 104 which is aligned with the z-axis. The detector 106 is located to the right of the object 104. Beams of radiation are projected from the source 102 toward the detector 106. The photons emitted by the source 102 that are not absorbed by the object 104 are transmitted toward and impact on the detector 106 forming an image 108 of the object 102 on the detector 106. The source 102 and the detector 106 that form the CT device are spun about the object 104. At predetermined angles and/or locations, additional two-dimensional projection images 108 of the object 102 are formed on the detector 106.

Figure 1B:
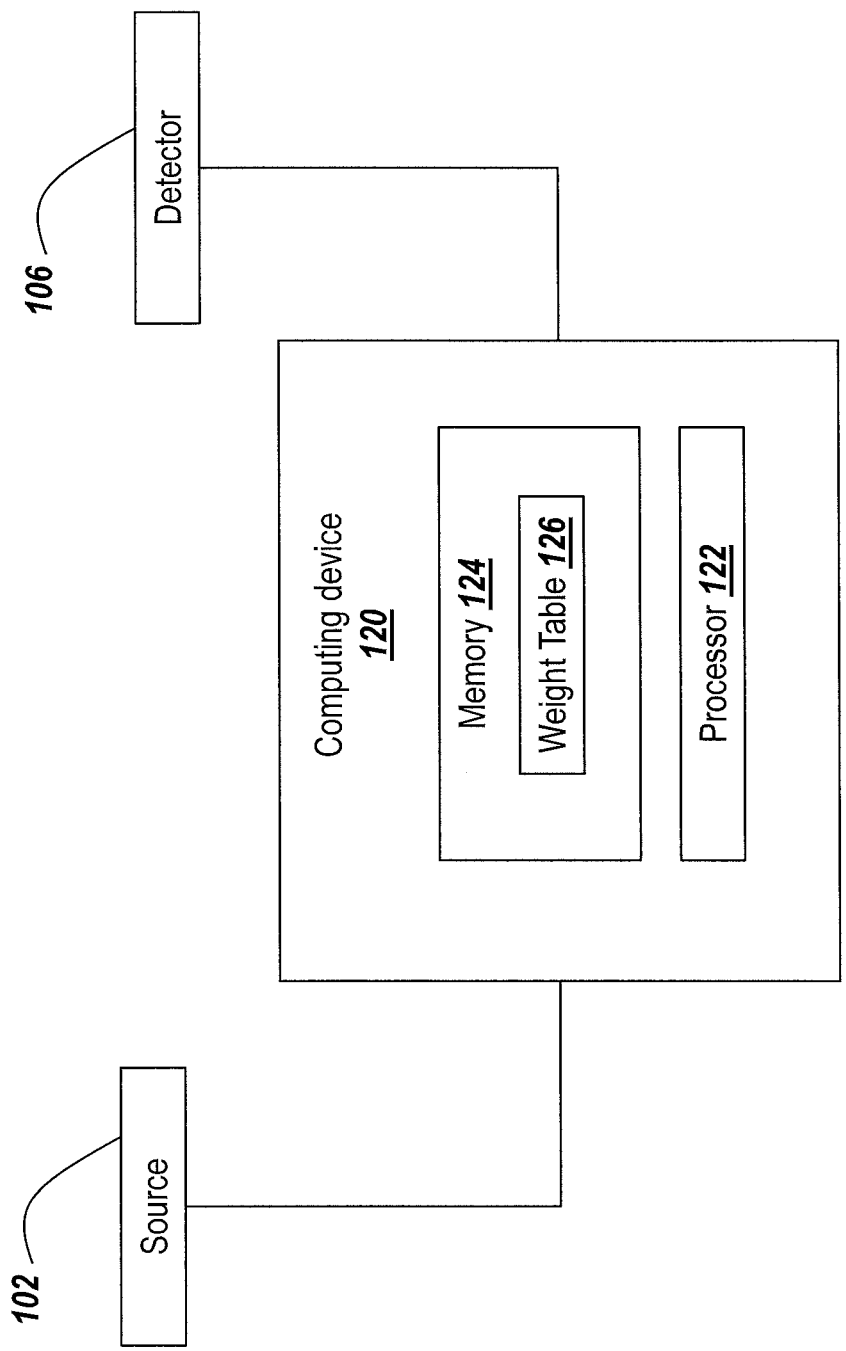
FIG. 1B illustrates a computing device coupled to the scanning system 100 of FIG. 1A.

As illustrated in FIG. 1B, the source 102 and the detector 106, i.e. the CT device, of the CT scanning system 100 can be controlled using a computing device 120. The computing device 120 may include a memory 124, e.g. a storage device, for storing data and a processor 122, such as a Graphical Processing Unit (GPU) which is discussed below in further detail.

The computing device 120 reconstructs the three-dimensional tomographic volume of the object by back-projection technique using the plurality of two-dimensional projection images 108 and a weight coefficient for each voxel of the object 104. The weight coefficient is the ratio of the distance between the source and a voxel of the geometry of the object to the distance between the detector and the same voxel of the object geometry. The weight coefficient for each voxel can be pre-calculated and saved in the memory 124 in the form of, for example, a table 126.

Figure 2:
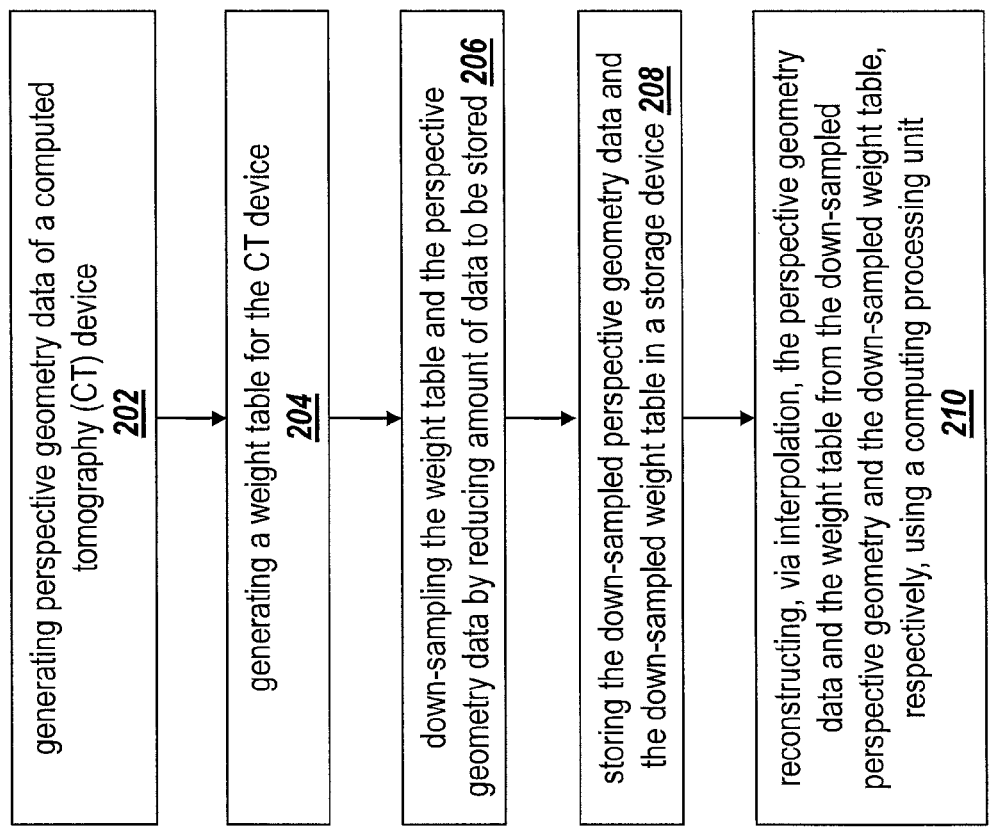
FIG. 2 illustrates a flowchart of steps for performing the three-dimensional volume reconstruction for computed tomography using weight coefficients according to various embodiments of the present invention.
Figure 3A:
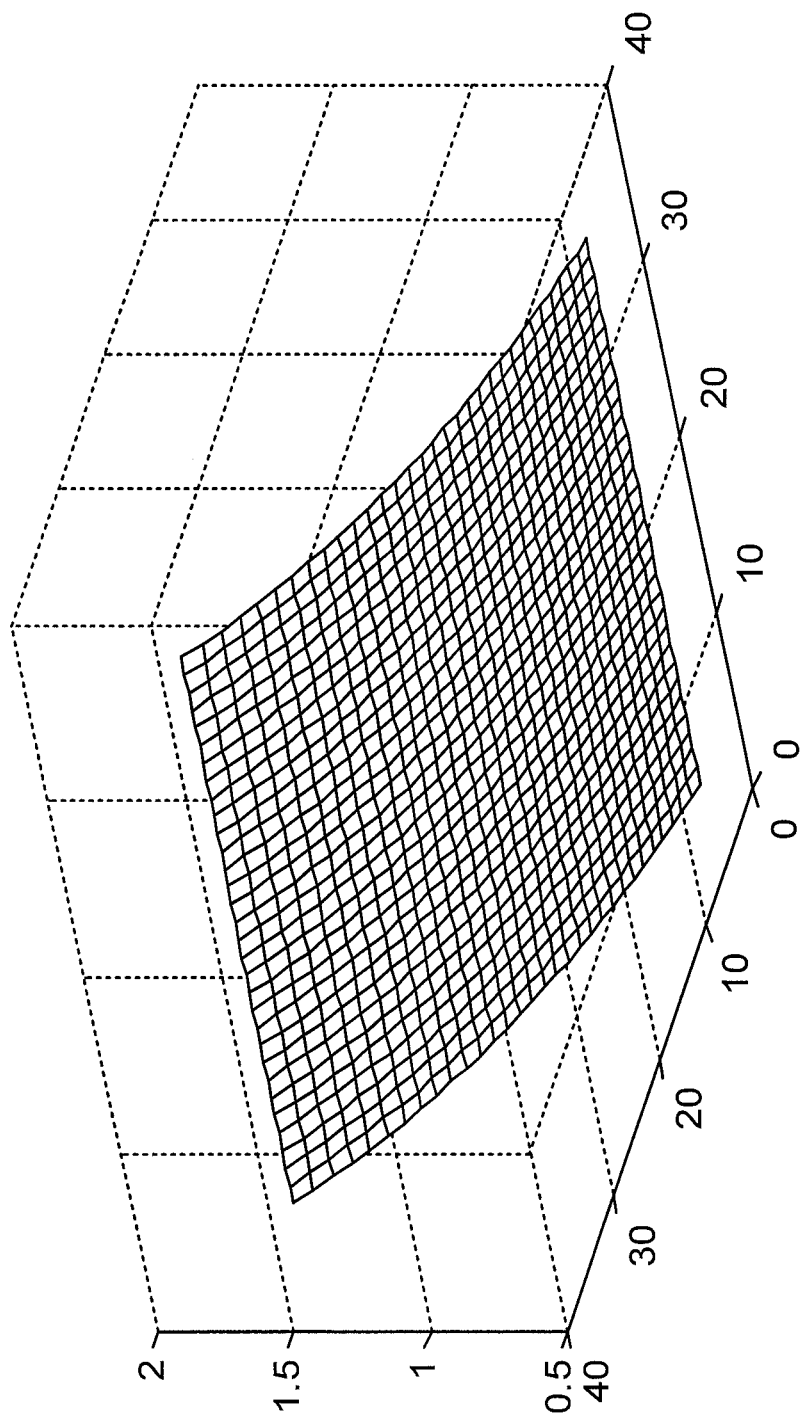
FIG. 3A illustrates how the weight values vary across a slice of the reconstructed volume for projection angle of 0 degrees.
Figure 3B:
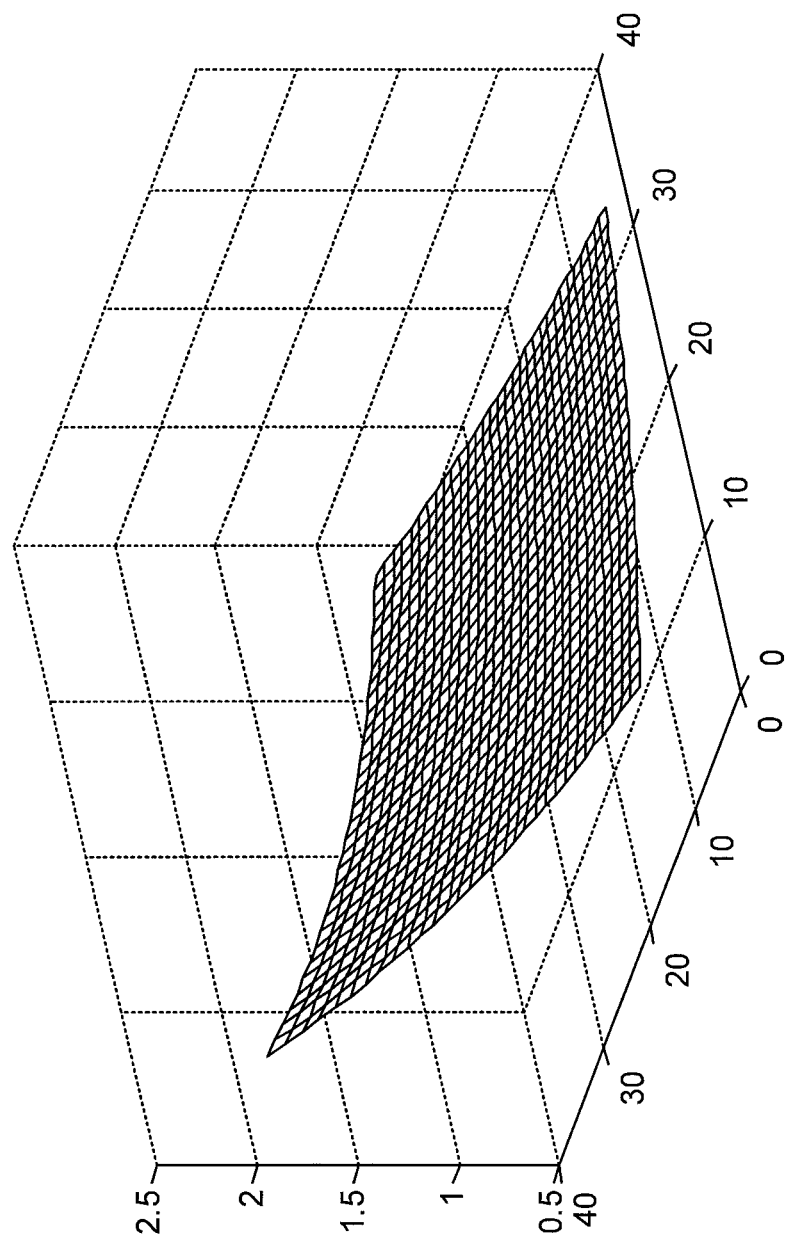
FIG. 3B illustrates how the weight values vary across a slice of the reconstructed volume for projection angle of 22.5 degrees.
Figure 3C:
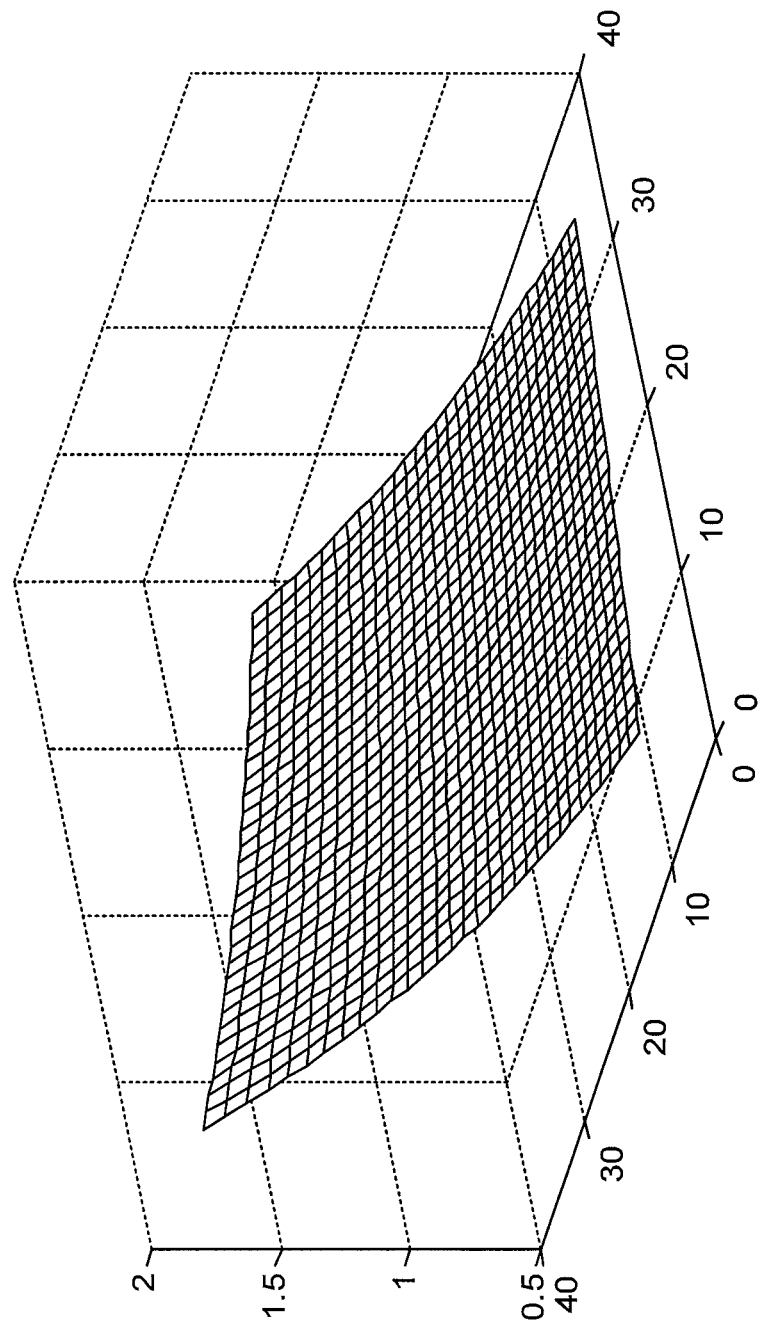
FIG. 3C illustrates how the weight values vary across a slice of the reconstructed volume for projection angle of 45 degrees.
Figure 3D:
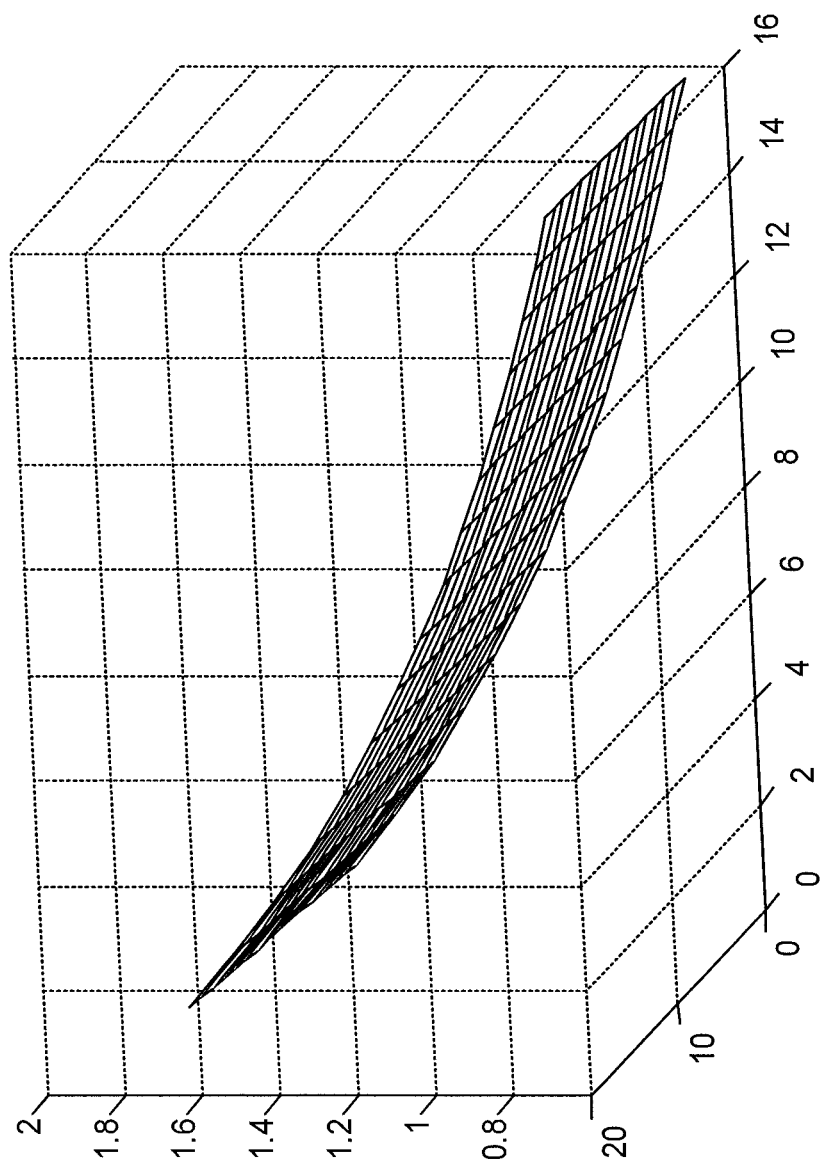
FIG. 3D illustrates how the weight values vary across a slice of the reconstructed volume for projection angle of 90 degrees.

FIG. 2 illustrates a flowchart 200 of steps for performing a down-sampling and perspective geometry data and a weight table associated with a computed tomography device according to various embodiments of the present invention. First the perspective geometry data of the computed tomography device is generated (step 202). At step 204, the weight table for the computed tomography device is generated. The geometry data and the weight table are associated with a given CT device. The geometry data and the weight table do not vary as a function of the object being scanned. As such, the geometry data and the weight table can be reused for scanning various objects using the same CT device. As long as the scanning rate and the physical geometry associated with the CT device remain constant, the associated geometry data and weight table also remain constant.

Above-described steps 202 and 204 are computationally complex and hence, very expensive. However, the geometry data and the weight table need only be calculated once for a specific CT device as long as the CT device is operated in a fixed configuration, i.e. the scanning rate and the physical geometry associated with the CT device remain constant.

Once the weight table and the perspective geometry data associated with the given CT device is calculated, the weight table and the perspective geometry data are down-sampled by reducing amount of data to be stored (step 206). The down-sampled perspective geometry data and the down-sampled weight table are stored in a storage device (step 208).

During the reconstruction of an tomographic volume of a scanned object, the perspective geometry data and the weight table are reconstructed, via interpolation, from the down-sampled perspective geometry and the down-sampled weight table, respectively, using a computing processing unit (step 210). Steps 202-208 are performed before the actual tomographic volume reconstruction process begins. Step 210 is repeated continuously during the tomographic volume reconstruction process for each object scanned using the CT device.

The weight table illustrating the weight coefficients can be calculated for all possible (x,y,z) locations of the object 104. As illustrated in FIG. 1A, the x-y-z coordinate system have one voxel of the object 104 shown at the center point. Specifically, the x-axis and the y-axis form a plane perpendicular to the z-axis. The u-v-s coordinate system have the projection image 108 of the object 104 at the center point. The U-axis is parallel to the z-axis and the V-axis is perpendicular to the z-axis. The entries of the weight table is calculated as follows:

$$s = -x^*\sin(\beta eta) + y^*\cos(\beta eta)$$

where the beta angle (β) 110 illustrated in FIG. 1A is the angle of rotation of the source 102 relative to the y-axis. The x and y coordinates are the physical location within the slice being reconstructed. The resulting weight coefficient for the location with coordinates (x, y) and the rotational angle beta (β) is:

$$WT = (DS0/(DS0-s))^2$$

where DS0 112 is the distance of the perpendicular ray 114 from the source 102 to the U-axis of the detector 106 as shown in FIG. 1A.

FIGS. 3A, 3B, 3C and 3D each illustrates a plot showing how the weight values vary across a slice of the reconstructed volume. Examples demonstrating the smoothness of the weight matrix or surface for projection angles of 0, 22.5, 45 and 90 degrees are illustrated in FIGS. 3A-3D, respectively. In each of FIGS. 3A, 3B, 3C and 3D, the vertical axis indicates the values stored in the 2-dimensional table of a single projection angle. These values vary from a peak value close to 1.7 to a low value close to 0.5. The other two axes in the plot represent a position (the x,y coordinates) in a slice through the reconstructed volume. According to an exemplary embodiment, a separate weight table can be computed and stored for each projection angle used by the CT system. High resolution CT systems may use many hundreds or even thousands of different projection angles in each rotation. For purposes of illustration, four representative angles are illustrated in FIGS. 3A-3D. Within each plot illustrated in FIGS. 3A-3D, a specific value changes significantly from one section of a given plot to another. The plots illustrated in FIGS. 3A-3D are not flat but rather have a shallow curve. However all of these plots are locally "smooth", i.e. the slope does not change significantly over a small number of adjacent points in the graph. Accordingly, the first derivative "the rate of change" is close to zero.

During the reconstruction computation, the weight table is interpolated to produce the perspective geometry to determine the location of the projected voxel on the detector and the weight factor to be applied.

For example, a system can reconstruct slices with 1024× 1024 voxels with a total of 400 projections using a single precision float (4 bytes) for each weight factor. If no symmetries are exploited, the system results in a weight table with a size of 1.6 GBytes. Reducing the size of the weight table provides a significant reduction in the memory storage and bandwidth requirements. Thus, resulting in a significant improvement in system performance and cost. Down-sampling the weight table by a factor of two in both X and Y-axes results in a factor of 4 reduction in both memory storage and access requirement of the weight table.

Figures 4A, 4B:
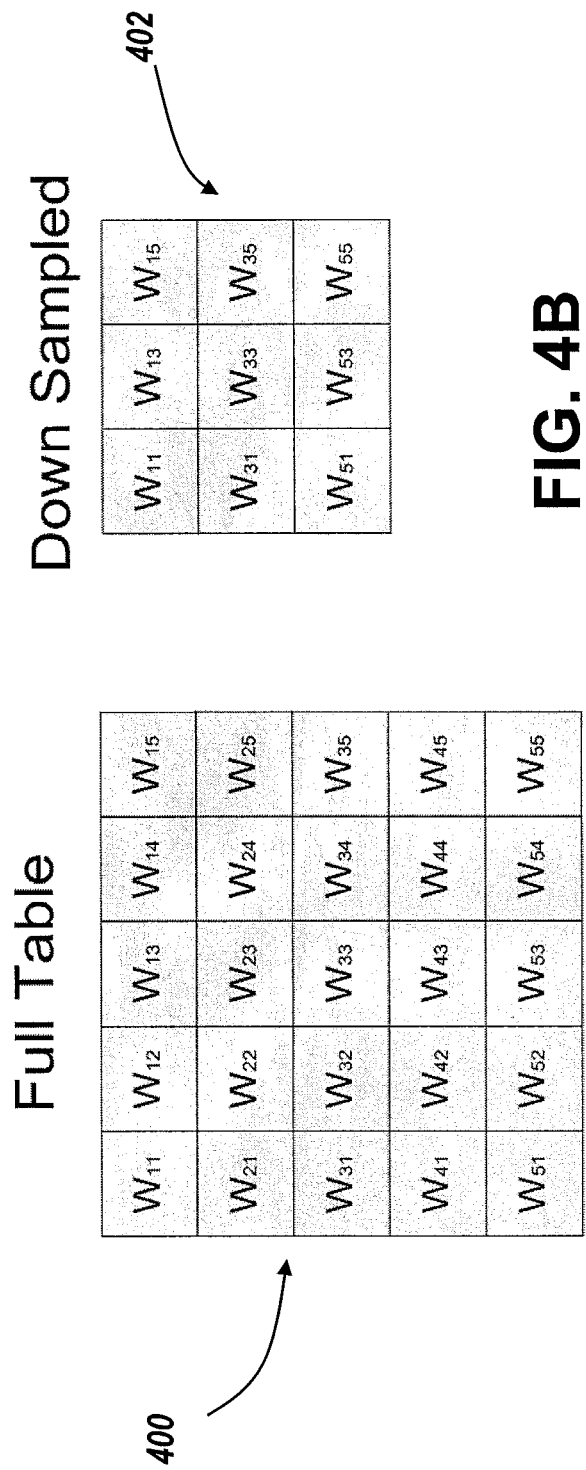
FIG. 4A illustrates a weight table according to various embodiments of the present invention.
FIG. 4B illustrates a down-sampled weight table corresponding to the weight table of FIG. 4A.

FIG. 4A illustrates a small (5×5) portion of an exemplary weight table 400. The weight table can be down-sampled using, but not limited to, methods such as bilinear, bicubic, or down-sampling in the frequency domain. FIG. 4B illustrates an exemplary down-sampled weight table 402 that corresponds to the full weight table 400 illustrated in FIG. 4A. The exemplary down-sampled weight table 402 is calculated using nearest neighbor selection method. During the back-projection computation, the down-sampled weight table can be re-calculated into the full, i.e. non-down-sampled, weight table by using an interpolation scheme such as bi-linear resampling. For example, if the weight table was down-sampled by 2, the factors in the bilinear interpolation, i.e. bilinear resampling, are 0 and 1, or 0.5 and 0.5. That is, to produce an estimate of the weight W22 for voxel (Y=2, X=2) would require combining the matrix values from the down-sampled matrix 402 as follows W22~=0.5*(0.5*W11+0.5*W13)+0.5*(0.5*W31+0.5*W33).

The foregoing example is provided for illustrative purposes only and should not be construed as limiting.

The amount of down-sampling is restricted both by the frequency content in the table, and the required fidelity of the reconstruction. The down-sampling is not limited to a factor of two nor must the down-sampling be the same in both dimensions. For an exemplary system generating slices of 1024×1024 voxels, a weight table of 1024×1024 values may be reduced to a 64×64 array if the weight matrix were down-sampled by 16 in each dimension. Such down-sampling will reduce the total memory requirement for the weight table by a factor of 256.

The loading of the weight table and subsequent interpolation can be performed in different ways, and may benefit from different storage models of the weight table. According to an embodiment of the invention, the back-projection technique may be implemented on a Graphical Processing Unit (GPU).

An exemplary embodiment is based on the nVIDIA Fermi Architecture using the CUDA software implementation. For this example, the weight matrix is down-sampled by 2 in both X and Y dimension using the nearest neighbor method. The slice being updated during the back-projection is of size 1024×1024, so the stored down-sampled weight table is 512× 512 in size. When updating a pixel location in the slice, ix, iy, where both ix and iy have a range of 0 to 1023, the index into the weight table is ix/2, and iy/2. So the weight factor to be applied by using fractional table addresses, ix/2, iy/2; weight factor Wt(ix,iy)=Wt_downsample(ix/2, iy/2).

The weight table can be stored in global device memory or in the texture memory of a computing device. Texture memory provides the unique capability of the GPU hardware to perform automatic interpolation. That is to say, the location of the weight table can be selected to a fractional address, as opposed to an integral address.

The GPU hardware can perform interpolation very efficiently using either nearest neighbor or a bi-linear interpolation. An exemplary code illustrating how a down-sampled texture can be interpolated to fill in a full resolution matrix is provided below. nVidia's CUDA C allows programmers to define C functions, called kernels (CUDA kernel), that when called, are executed N times in parallel by N different CUDA threads, as opposed to only once like regular C functions. The interpolateWeight function below is such a CUDA kernel. The variable downsampledWeightTexture, is the reference to the texture surface, full_resoution_weight is the full resolution weight matrix that will be produced, down-sample is the down-sample factor, and size is the width and height of the full resolution weight matrix. The blockDim, blockIdx, and threadIdx are specific structures that allow the CUDA kernel executed by each CUDA thread to determine which data it is to process. Note that locations u, and v are floating point values, and thus are sampling the table stored as a texture surface at fractional or non-integral locations.

```
// 2D float texture, defines a 2 dimensional texture.
texture<float, 2, cudaReadModeElementType> downsampledWeightTexture;
// Kernel definition
___global___ void interpolateWeight(float* full_resolution_weight,
int downsample, int size)
{
    // Calculate normalized texture coordinates
    unsigned int x = blockIdx.x * blockDim.x + threadIdx.x;
    unsigned int y = blockIdx.y * blockDim.y + threadIdx.y;
    float u = x / (float)downsample;
    float v = y / (float)downsample;
    if(y<size && x<size)
        full_resolution_weight[y * size + x] =
        tex2D(downsampledWeightTexture, u, v);
    }
}
```

The embodiment on the GPU is not restricted to using a texture surface. According to various embodiments of the present invention, it may be advantageous for each processing kernel to load the 4 corners of the down-sampled table, and compute the interpolation within the CUDA kernel.

A similar approach can be taken using a general purpose processor. In this case, the load of the table can be done as a 4-tuple, and a vector processor (i.e. Altivec or Intel SSE) can be used to compute the interpolated value.

Whatever embodiment is employed, the benefit is gained from the same fundamental innovation, which is to reduce the amount of the bandwidth and memory storage by storing a down-sampled representation of the weight tables and interpolating the tables during the back projection.

Consider the reconstruction where the weight factors and perspective geometry defining the projection of a voxel onto the detector are defined by the pre-computed arrays below. It is assumed that the tables some periodicity from one set of z-planes, but for this example the periodicity is not shown.

$Xi$ $0<=i<Nx$ defines X index of the voxel for a given slice and Nx is the number of voxels in x.

$Yj$ $0<=j<Ny$ defines the Y index of the voxel for a given slice where Ny is the number of voxels in y $Zk$ $0<=k<Nz$ defines the Z index (or slice) and Nz is the number of voxels (or slices) in z $Vl$ $0<=l<Nv$ defines the row index in the detector and Nv is the number of detector rows $Um$ $0<=m<Nu$ defines the column index in the detector and Nu is the number of detector columns $\alpha_n$ $0<=n<N\alpha$ defines the projection index and $N\alpha$ is the number of projections contributing to one slice Vol(Zk, Yj, Xi) Is the volume being reconstructed.

P(z, $\alpha$, Um, Vl) is the two dimensional Raw data from the detector in a u,v grid.

U(z, $\alpha$, y, x) defines the location each element can be obtained by selecting U(Zk, $\alpha_n$, Yj, Xi). For a given Zk, $\alpha_n$, the location is a two dimensional table.

V(z, $\alpha$, y, x) where each element can be obtained by selecting V(Zk, $\alpha_n$, Yj, Xi). For a given Zk, $\alpha_n$, the location is a two dimensional table.

W(z, $\alpha$, y, x) where each element can be obtained by selecting W(Zk, $\alpha_n$, Yj, Xi). For a given Zk, $\alpha_n$, the location is a two dimensional table.

As noted, since for a given Z plane, and given projection, $\alpha_n$, a 2-dimensional table can be stored. It is these two dimensional tables that can be interpolated during the process.

To perform the backprojection step is simply limited to the following steps:

```
For each (Zk)
    For each project($\alpha_n$)
        For each Yj
            For each Xi
                Vol(Zk, Yj, Xi) = Vol(Zk, Yj, Zi) + W(Zk, $\alpha_n$, Yj,
Xi) * P(Zk, $\alpha_n$, V(z, $\alpha$, y, x), U(z, $\alpha$, y, x));
            End
        End
    End
End
```

In this example, Weight matrix and the location of projections on the detector, U and V, are stored in a full resolution table. However, the invention proposes that the tables be down-sampled prior to processing and interpolated during the inner loop of the back-projection. So, for example, assume the projected location of a voxel on the detector and the weights have all been down sampled by 4. Let the down-sampled matrices be represent by W4, V4 and U4.

Then the processing steps become,

```
For each (Zk)
    For each project($\alpha_n$)
        // Get the two references (pointer) to the two dimensional
        location and weight matrices
        WW4 = W4(Zk, $\alpha_n$, :, :); # Get just the start of
        the two dimensional matrix.
         UU4 = U4(Zk, $\alpha_n$, :,: )
         VV4 = V4(Zk, $\alpha_n$, :,: )
        For each Yj
            For each Xi
                U = interp(WW4, Yj, Xi);
                V = interp(UU4, Yj, Xi);
                WT = interp(WW4, Yj,Xi);
                Vol(Zk, Yj, Xi) = Vol(Zk, Yj, Zi) + WT * P(Zk,
                $\alpha_n$, V, U);
            End
        End
    End
End
```

Where the details of interpolation is dependent on the architecture and storage method.

The foregoing description of embodiments and examples is intended to provide illustration and description, but is not intended to be exhaustive. Modifications and variations are possible in light of the above teachings or may be acquired from a practice of the invention. It is intended that the invention will include any and all particular embodiments and equivalents falling within the scope of the following appended claims.

It will be apparent that one or more embodiments or examples, described herein, may be implemented in many different forms of software and hardware. Software code and/or specialized hardware used to implement embodiments described herein is not limiting of the invention. Thus, the operation and behavior of embodiments were described without reference to the specific software code and/or specialized hardware—it being understood that one would be able to design software and/or hardware to implement the embodiments based on the description herein.

The invention claimed is:

1. A computer-implemented method for down-sampling and restoring perspective geometry data and a weight table associated with a computed tomography device, the method comprising:
generating perspective geometry data associated with the computed tomography device;
generating a weight table associated with the computed tomography device;
down-sampling the weight table and the perspective geometry data to reduce an amount of data to be stored;
storing the down-sampled perspective geometry data and the down-sampled weight table associated with the computed tomography device in a storage device; and
reconstructing, via interpolation, the perspective geometry data and the weight table from the down-sampled perspective geometry and the down-sampled weight table, respectively, using a computing processing unit during a tomographic volume reconstruction process for an object scanned using the computed tomography device.

2. The method of claim 1, wherein the computing processing unit is a graphical processing unit (GPU).

3. The method of claim 2, wherein the down-sampled weight table is stored as a texture surface by the GPU.

4. The method of claim 1 further comprising:
generating a three-dimensional tomographic volume of the object using the perspective geometry data and the weight table during the tomographic volume reconstruction process.

5. The method of claim 4, wherein the three-dimensional tomographic volume is generated using a back-projection technique, algebraic reconstruction technique (ART) or maximum likelihood expectation maximization (MLEM) technique for the computed tomography.

6. The method of claim 1, wherein the weight table is a two-dimensional table.

7. The method of claim 1, wherein the weight table includes a weight for each voxel within a geometry of the object being scanned for computed tomography.

8. The method of claim 7, wherein the weight for a voxel is equal to the ratio of a distance between the voxel and an energy source used for the computed tomography to a distance between the voxel and a detector used for the computed tomography.

9. The method of claim 1, wherein the down-sampled weight table is calculated from the weigh table using one or more of bilinear down-sampling, bicubic down-sampling or down-sampling in the frequency domain.

10. A system comprising:
a processor for:
generating perspective geometry associated with a computed tomography device;
generating a weight table associated with the computed tomography device;
down-sampling the weight table and the perspective geometry data to reduce an amount of data to be stored;
storing the down-sampled perspective geometry data and the down-sampled weight table associated with the computed tomography device in a storage device; and
reconstructing, via interpolation, the perspective geometry data and the weight table from the down-sampled perspective geometry and the down-sampled weight table, respectively during a tomographic volume reconstruction process for an object scanned using the computed tomography device.

11. The system of claim 10, wherein the processor is a graphical processing unit (GPU).

12. The system of claim 11, wherein the down-sampled weight table is stored as a texture surface by the GPU.

13. The system of claim 10, wherein the processor further generates a three-dimensional tomographic volume of the object using the perspective geometry data and the weight table during the tomographic volume reconstruction process.

14. The system of claim 13, wherein the three-dimensional tomographic volume is generated using a back-projection technique, algebraic reconstruction technique (ART) or maximum likelihood expectation maximization (MLEM) technique for the computed tomography.

15. The system of claim 10, wherein the weight table is a two-dimensional table.

16. The system of claim 10, wherein the weight table includes a weight for each voxel within a geometry of the object being scanned for computed tomography.

17. The system of claim 16, wherein the weight for a voxel is equal to the ratio of a distance between the voxel and an energy source used for the computed tomography to a distance between the voxel and a detector used for the computed tomography.

18. The system of claim 10, wherein the down-sampled weight table is calculated from the weigh table using one or more of bilinear down-sampling, bicubic down-sampling or down-sampling in the frequency domain.

19. A non-transitory computer-readable medium for storing instructions that, when executed on a computer, down-sample and restore perspective geometry data and a weight table associated with a computed tomography device, the medium storing one or more instructions for:
generating perspective geometry data associated with the computed tomography device;
generating a weight table associated with the computed tomography device;
down-sampling the weight table and the perspective geometry data to reduce an amount of data to be stored;
storing the down-sampled perspective geometry data and the down-sampled weight table associated with the computed tomography device in a storage device; and
reconstructing, via interpolation, the perspective geometry data and the weight table from the down-sampled perspective geometry and the down-sampled weight table, respectively, using a graphical processing unit (GPU) during a tomographic volume reconstruction process for an object scanned using the computed tomography device, wherein the down-sampled weight table is stored as a texture surface by the GPU.

20. The non-transitory medium of claim 19 further storing one or more instructions for:

generating a three-dimensional tomographic volume of the object using the perspective geometry data and the weight table during the tomographic volume reconstruction process.

* * * * *